(12) United States Patent
Karlsson et al.

(10) Patent No.: US 8,353,471 B2
(45) Date of Patent: Jan. 15, 2013

(54) METHOD OF PRODUCING A FRAME UNIT

(75) Inventors: Henrik Karlsson, Värnamo (SE); Kurt Sjöberg, Bredaryd (SE); Ulf Henning, Värnamo (SE); Björn Pettersson, Värnamo (SE)

(73) Assignee: Rapid Granulator AB, Bredaryd (SE)

( * ) Notice: Subject to any disclaimer, the term of this patent is extended or adjusted under 35 U.S.C. 154(b) by 202 days.

(21) Appl. No.: 12/811,711

(22) PCT Filed: Dec. 26, 2008

(86) PCT No.: PCT/SE2008/000708
§ 371 (c)(1),
(2), (4) Date: Jul. 6, 2010

(87) PCT Pub. No.: WO2009/088325
PCT Pub. Date: Jul. 16, 2009

(65) Prior Publication Data
US 2010/0276565 A1    Nov. 4, 2010

(30) Foreign Application Priority Data
Jan. 10, 2008    (SE) ...................................... 0800057

(51) Int. Cl.
*B02C 17/16*    (2006.01)
(52) U.S. Cl. ................... 241/27; 241/1; 241/30; 241/73
(58) Field of Classification Search ............ 248/679, 248/678, 672, 637; 29/592, 527.1, 428, 897.312; 241/1, 27, 30, 73, 191
See application file for complete search history.

(56) References Cited

U.S. PATENT DOCUMENTS

| | | | |
|---|---|---|---|
| 3,334,850 A | | 8/1967 | Jackson et al. |
| 7,255,296 B2 * | | 8/2007 | Karlsson et al. ............ 241/285.3 |
| 7,766,263 B2 * | | 8/2010 | Karlsson et al. ................. 241/73 |
| 2007/0034726 A1 * | | 2/2007 | Karlsson et al. ........... 241/285.2 |
| 2009/0314924 A1 * | | 12/2009 | Settele et al. .................. 248/679 |
| 2011/0089279 A1 * | | 4/2011 | Karlsson et al. .............. 241/277 |
| 2011/0095114 A1 * | | 4/2011 | Karlsson et al. .............. 241/191 |

FOREIGN PATENT DOCUMENTS

| | | |
|---|---|---|
| DE | 4213085 C1 | 9/1993 |
| EP | 0054276 A1 | 6/1982 |
| EP | 0293322 A2 | 11/1988 |
| EP | 324125 A1 | 7/1989 |
| GB | 2147026 A | 5/1985 |
| JP | 58102638 A | 6/1983 |
| JP | 2007262798 A | 10/2007 |
| WO | 9109249 A1 | 6/1991 |

OTHER PUBLICATIONS

International Search Report for corresponding International Application PCT/SE2008/000708.
Written Opinion of ISA for corresponding International Application PCT/SE2008/000708.
International Preliminary Report on Patentability for corresponding International Application PCT/SE2008/000708.
Supplementary European Search Report (Mar. 9, 2012) for corresponding European App. 08 86 9643.

* cited by examiner

*Primary Examiner* — Todd M. Epps
(74) *Attorney, Agent, or Firm* — WRB-IP LLP

(57) ABSTRACT

A method of producing a foundation bed (1) for a granulator mill includes the steps that the foundation bed is cast from a plastic- or concrete based casting material in a mold (13) manufactured from thin sheet metal, the mold being given surfaces (16) for cooperation with a granulator mill housing (2) with high precision. In order to avoid after-treatment of the surfaces (16) of the mold intended for cooperation with the granulator mill housing, these surfaces are clamped during the casting process against a common, configurationally stable clamping member.

12 Claims, 4 Drawing Sheets

METHOD OF PRODUCING A FRAME UNIT

BACKGROUND AND SUMMARY

The present invention relates to a method of producing a frame unit for a machine for comminuting or granulating plastics, such as a granulator mill or a shredder, the frame unit being provided at least with anchorages for a granulator mill housing and a drive motor, and the frame unit being at least partly cast from a plastic- or concrete-based casting material in a mold which, in the finished state of the frame unit, has surfaces for cooperation with the mill housing.

The present invention also relates to a frame unit produced according to the method, and a machine for comminuting or granulating plastics material using such a frame unit.

In machines for comminuting plastic, and in particular such plastic as is to be recycled and reused, there are extremely exacting requirements in place that the comminuted plastic must be completely free of impurities such as dust, foreign matter, metal fragments, gravel etc. The reason is that such impurities, even in extremely slight quantities, would render the comminuted plastic material completely unusable. As a result, extremely stringent requirements are in place relating to cleanliness in, at and around all of the machinery handling the plastic material, naturally also including the machinery that is employed for the comminution or granulation proper.

For the sake of simplicity, the discussion below will refer to granulator mills for the plastics industry, without, to that end, other types of machinery for comminuting plastics being excluded, for instance shredders.

Granulators of the type that are employed in the plastics industry for recycling plastic materials generate enormous amounts of noise and vibration. Particularly sever conditions arise if the granulator is fed with large lumps of hard plastics material which are thrown about inside the housing of the granulator mill during the initial phase of a grinding operation.

Those requirements on precision that apply to granulators of the type under consideration here are extremely stringent, since there are disposed, interiorly in the granulator mill housing, a number of fixed knives which cooperate with corresponding knives on a rotor rotating in the granulator mill housing. The clearance between the fixed and moving knives while in operation is extremely slight, and must be kept constant with extremely narrow tolerances even if the granulator mill is supplied with large lumps of plastics material.

If the above-described precision and the rigidity in the granulator mill housing and the rotor could not be guaranteed, the risk is imminent that the knives would clash with one another, so that metal fragments would become admixed in the finished plastic granulate.

Traditionally, granulator mills have been constructed on a supporting frame system consisting of or comprising welded steel profiles of heavy-duty dimensions, partly for reasons of mechanical strength and partly for the reason that the intention is to impart to the granulator mill as great a mass as possible in order to avoid vibrations and noise being transmitted to the ambient environment.

The mill housing proper is generally manufactured as a self-supporting unit, which, as was mentioned above, houses on the one hand the rotor and on the other hand the fixed knives. Traditionally, such a granulator mill housing is bolted in place to the above-mentioned framework system which also serves as a mounting for the drive motor which drives the mill. Further components are normally also disposed on the framework, such as for instance auxiliary aids for opening and closing the infeed section of the mill, conduits for finished granulate or conveyors for such material as is to be ground. The mill housing has feet which are machined to extremely stringent tolerances, which also applies to the surfaces of the framework system on which the feet of the mill housing are bolted in place.

It is previously known in the art to employ machine beds or foundations consisting of or comprising concrete. The main purpose of such foundations is to create the mass which is needed for the machine in question to stand still. Another reason may also be to insulate a machine in terms of vibration from the surroundings with a very high degree of accuracy, so that ground vibrations, for example from nearby traffic, do not reach the machine. Such foundations need not maintain any particularly narrow tolerances, since the machine in question is often provided with adjustment devices which can compensate for any possible deviations and shortcomings.

It is also previously known in the art to manufacture bearing machine components, such as frame units or sections etc., from different types of casting materials, both plastic-based and concrete-based. One example of such a construction is shown in EP 0293322 A2.

Concrete possesses the property that it may emit dust and small particles even without any manifest surface damage, and smaller or larger chips or chunks if it is subjected to powerful mechanical action, for example if a heavy object is dropped on it or if a truck is driven over it.

It is desirable to design the method intimated by way of introduction such that a frame unit may be realised which possesses the requisite large mass at low cost. It is also desirable to design the method such that the precision in the finished frame unit will be sufficiently great so as not to require any retro-working before the granulator mill is mounted in place. It is also desirable to design the method such that the risk of contamination of comminuted or granulated plastic material is obviated as far as is possible.

According to an aspect of the present invention, the method intimated by way of introduction is characterised in that the mold, after the casting operation, is left in position on the casting material, that the mold is given surfaces for cooperation with the granulator mill housing and that the surfaces of the mold intended for cooperation with the mill housing are kept fixed within predetermined tolerances during the casting operation.

BRIEF DESCRIPTION OF THE ACCOMPANYING DRAWINGS

The present invention will now be described in greater detail hereinbelow with reference to the accompanying Drawings. In the accompanying Drawings.

DETAILED DESCRIPTION

As will have been apparent from the foregoing disclosures, the present invention relates to a method for the production of a frame unit in general for a machine for the comminution or granulation of plastics. For the sake of simplicity, the present invention will only be described with reference to one specific case, namely a granulator mill for the plastics industry.

Figure 1:
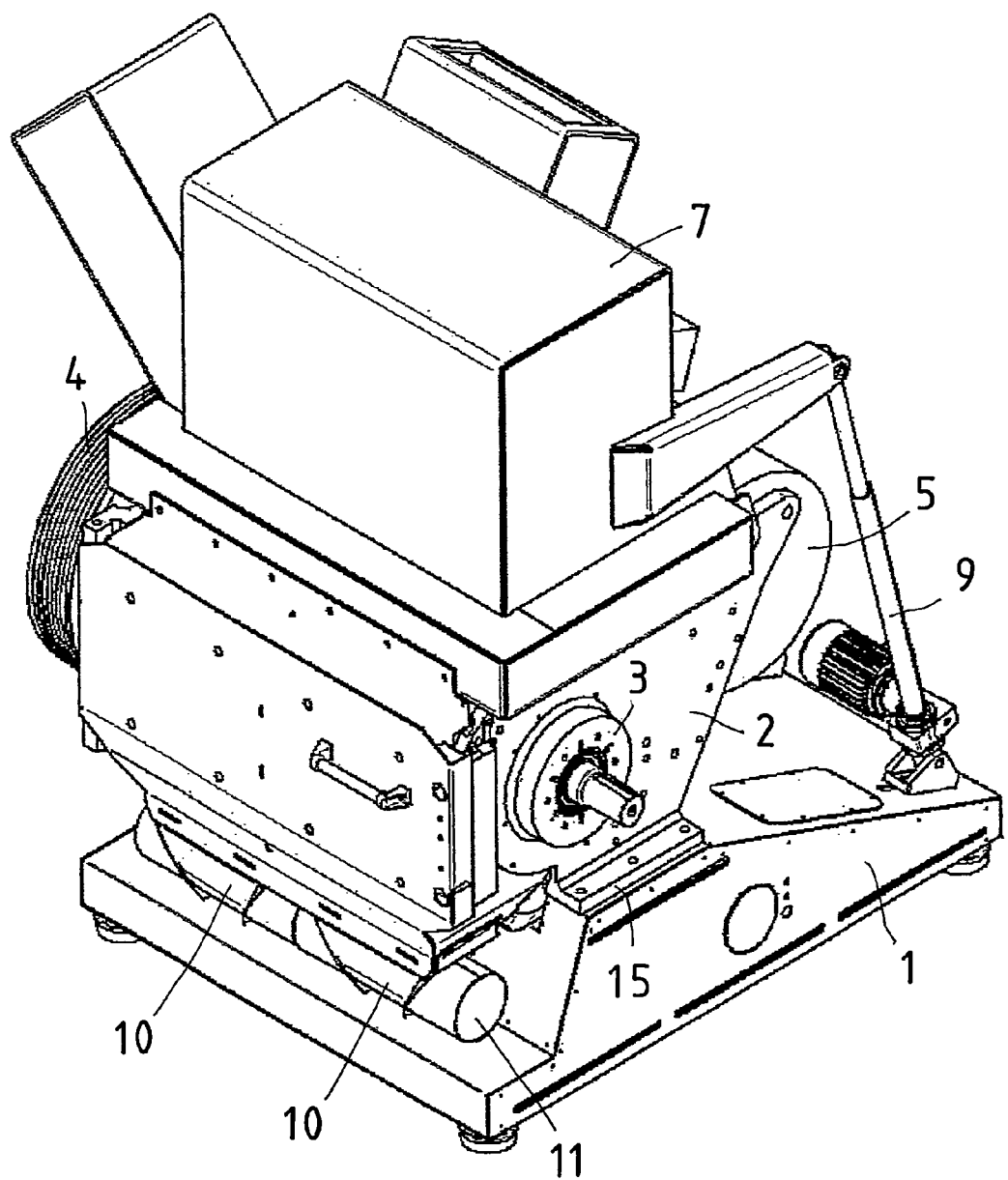
FIG. 1 shows a granulator mill in perspective with a frame unit produced according to the present invention.
Figure 2:
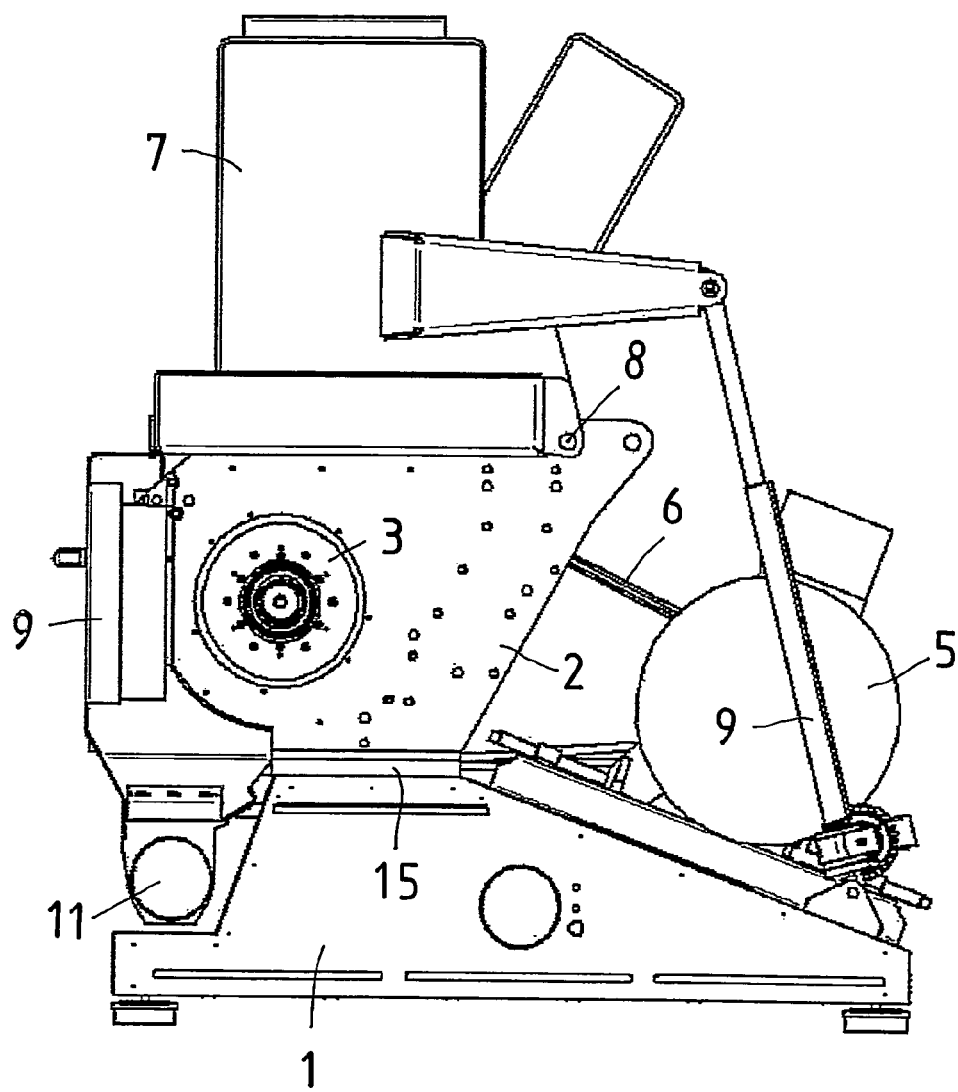
FIG. 2 is a straight side elevation of the granulator mill according to FIG. 1.

It will be apparent from FIGS. 1 and 2 that a granulator mill has a supporting frame unit 1 on which a number of additional components are mounted. Thus, on the frame unit 1, there is secured a granulator mill housing 2 in which there is disposed a rotor with a number of knives. The rotor is journalled in journal boxes 3 on the mill housing 2 and has a shaft, on whose distal end in FIG. 1 a drive wheel 4 is mounted and on whose end turned to face the observer of FIG. 1, a flywheel is intended to be mounted.

Driving of the rotor takes place by the intermediary of a drive motor 5 with a belt transmission 6.

On the upper side of the mill housing 2, there is disposed a hopper 7 which is pivotal about a horizontal shaft 8 so that it may thereby be opened, for example on cleaning or service of the interior of the mill. In order to facilitate opening and closing of the hopper 7, there is provided a motor driven screw mechanism 9.

The mill housing 2 further displays an openable hatch 9 which supports receptacle boxes 10 for receiving finished granulate and removing the granulate by the intermediary of suitable conduits 11.

The frame unit 1 has, on its upwardly facing surfaces and also on the greater part of its side surfaces, a thin sheet metal layer 13 on which the above-mentioned components rest and are bolted in place. A casting material has been cast inside the frame unit, and this material may preferably consist of or comprise concrete, but may also be plastic-based. The concrete imparts to the frame unit 1 its considerable mass, in the version under consideration here approx. 2,000 kg.

The sheet metal casing 13 fulfils the function, on the one hand, of a protective outer casing for the frame unit 1 and, on the other hand, of a mold when the casting material of the frame unit is cast. The mold is thus left in position after the completed casting operation.

A number of anchorage devices 12 (FIG. 4) are fixedly secured in the concrete material, and display, on the outside of the sheet metal casing 13 threaded sections for fixedly securing the above-considered components on the frame unit 1. It will further be apparent from FIG. 4 that reinforcing rods 14 are provided in the casting material in the traditional manner. It will further be apparent from the Figure that there are created in the casting material channels, ducts, and spaces for assembling electric equipment etc., in that the sheet metal casing 13 is provided, prior to the casting operation, with suitable cores, tubes, conduits or the like. In order to create improved cohesion between the sheet metal casing 13 and the casting material, the sheet metal casing may be provided on its inside with further anchorage devices which extend into the casting material so that they are fixed in it.

As was intimated above, the sheet metal casing 13 is produced from thin sheeting using conventional workshop engineering methods. The thickness of the sheet metal is of the order of magnitude of between 1 and 3 mm and, as a result, has extremely limited mechanical strength. According to the present invention, the sheet metal casing 13 is riveted or welded together without any major requirements on precision. Possible gaps in the sheet metal casing 13, e.g. at joints, corners etc., may readily be sealed off, for example using strips of adhesive tape or the like.

The precision finishing in the sheet metal casing proper need not be excessive, since the sheet metal material, as will be apparent below, may readily be adjusted because of its slight mechanical strength to the intended tolerances as regards dimensions, shape and position of critical portions.

The granulator mill housing 2 has feet 15 by the intermediary of which the housing rests on the frame unit 1. These feet 15 further display boltholes corresponding to the above-mentioned anchorage devices 12, so that the granulator mill housing may be bolted in position with good strength on the frame unit 1.

Mention was made in the foregoing of the extremely high requirements on accuracy and precision which apply to the granulator mill housing. The implies that the undersides of both of the feet 15 have been machined to high precision so that, in the illustrated embodiment, they lie in a single common plane. These machined surfaces on the feet 15 will abut against and cooperate with corresponding surfaces 16 on the frame unit 1 in the finished state of the granulator mill. For this reason, it is crucially important that these surfaces 16 on the frame unit 1, hence on the outside of the sheet metal casing 13, maintain the same high precision as the feet 15, as regards both position (alignment) and dimension tolerances. Thus, the surfaces must be smooth and lie in a common plane in the same manner as the undersides of the feet 15. In a granulator, where the internal length of the granulator mill housing 2 is 1,200 mm, a dimensional deviation for the surfaces 16 of the frame unit 1 cooperating with the granulator mill housing 2 must be at most approximately 0.1 mm if the function of the granulator mill is not be jeopardised.

Figure 3:
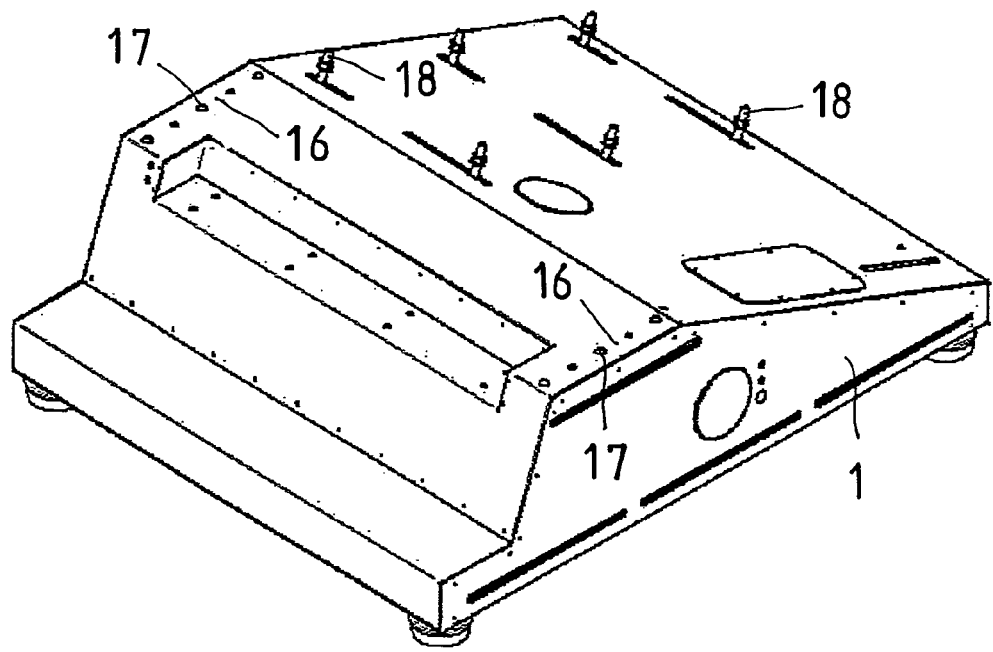
FIG. 3 shows two perspective views obliquely from above of the frame unit included in the granulator mill according to FIGS. 1 and 2.
Figure 3:
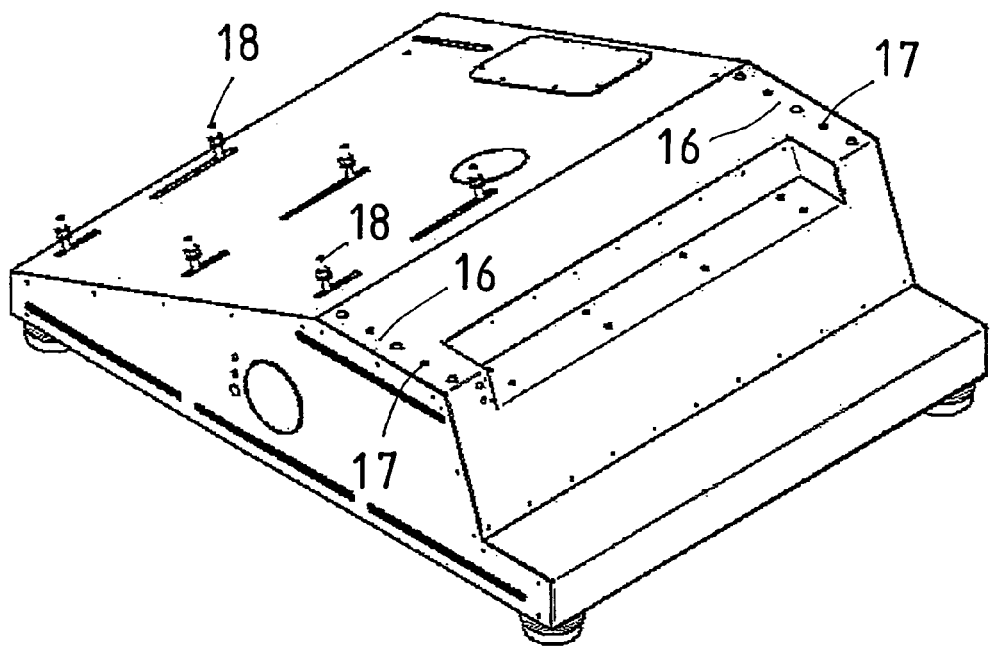

FIG. 3 shows the surfaces of the frame unit 1 intended for cooperation with the granulator mill housing at reference numeral 16, and those boltholes which are employed for bolting the feet 15 of the granulator mill housing in position have been given reference numeral 17. The anchorage devices 12 which are employed for bolting the feet 15 to the frame unit 1 extend out through the holes 17. This Figure further shows the anchorages 18 that are employed for fixedly retaining the drive motor 5.

As was mentioned above, the casing 13 for the frame unit 1 is produced from thin sheet metal without any major requirements on precision. The casting of the casting material, preferably concrete, takes place with the sheet metal casing 13, i.e. the mold, in the position illustrated in FIG. 4, i.e. inverted as compared with the position of use of the granulator mill according to FIGS. 1 and 2. Because of the weight of the concrete, and the low level of mechanical strength, or flimsiness of the sheet metal casing, warping and poor tolerances could occur in the sheet metal casing proper during the casting process. According to the present invention, at least the surfaces 16 of the sheet metal casing 13 intended for cooperation with the granulator mill housing 2 are fixed during the concrete casting operation within predetermined configurational and positional tolerances, in that these surfaces are held fixedly clamped in or against a fixture possessing the requisite precision and strength. As a result, the dimensional accuracy of the fixture will be transmitted to the surfaces 16.

After hardening or curing of the casting material, the sheet metal casing is left in position on the casting material so that this material will have an outer shell of sheet metal which fulfils the function of protective carapace. As a result, dust, particles, chips and possibly larger chunks of the casting material, for instance after wear or collision will be prevented from dispersing into the surroundings and thereby also into the plastic material which is granulated or comminuted in the granulator mill. Such a contamination of the plastic material would render it totally useless.

Figure 4:
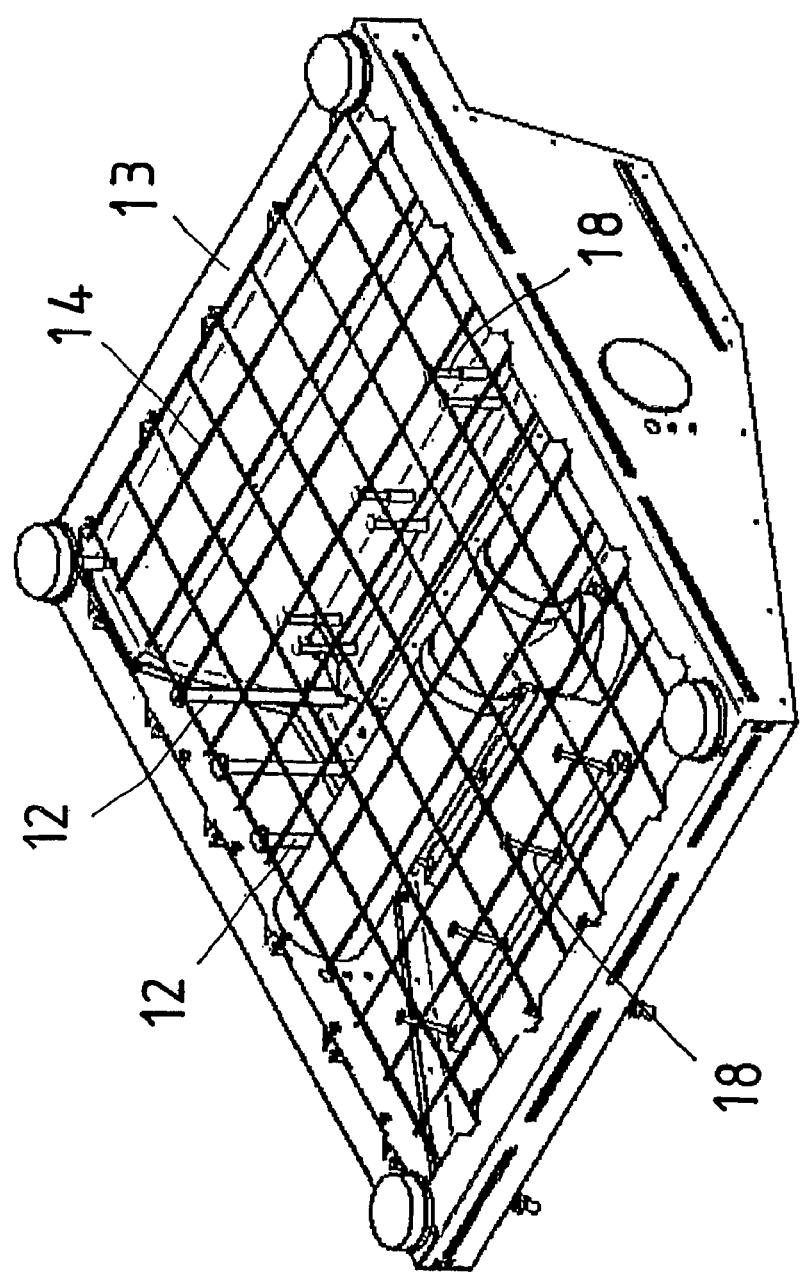
FIG. 4 shows a mold for producing the frame unit in the inverted state, i.e. in that state in which the frame unit is finished.

As was intimated above, the sheet metal casing has been given such a design that it covers the upwardly facing surfaces of the casting material, but also its side surfaces so that, on casting in the position according to FIG. 4, the sheet metal casing can be filled up right to the edge.

As regards the aspect that no particles or dust may be emitted from the casting material, it is possible according to the present invention either to enclose the underside of the casting material as well (in the position according to FIGS. 1 and 2) or to treat this underside with a protective paint possessing a dust or particle-binding capacity.

In one practical embodiment, the fixture may be designed as a configurationally stable clamp, for example of thick metal or in the form of a steel beam, which has been machined to the requisite precision. Such a clamp may be disposed either on the outside of the sheet metal casing 13, or on its inside. In this latter case, the clamp will be left in position in the casting material, while in the former case it may be removed after the casting operation in order to be reused. For fixing of such a clamp in position, use is ideally made of those anchorage devices 12 which are later to be employed for bolting the granulator mill housing in position on the frame unit 1.

In order to improve the abutment of the anchorage devices 12 against the inside of the sheet metal casing 13, it is possible or perhaps even advisable to apply washers or disks between the anchorage devices and the sheet metal casing which distribute the pressure of the anchorage devices over a greater area.

Instead of using the anchorage devices, 12 it is possible by other means to secure a clamping or anchorage device disposed on the outside of the sheet metal casing 13, for example by welding, gluing or similar techniques. However, such an anchorage device is left in place on the sheet metal casing so that the feet 15 of the granulator mill housing 2 rest on the anchorage device.

According to the present invention, it is also possible to mount guide rails on the outside of the sheet metal casing 13 for guiding the feet 15 of the granulator mill housing 2 to their correct positions.

While it is appropriate to dispose the feet 15 of the granulator mill housing 2 so that their undersides lie in a common plane, other variations are also possible. Thus, the undersides of the feet may, for example, be disposed in two different, possibly mutually parallel planes.

If the precision that is attained on the outside of the sheet metal casing 13, in particular the surfaces 16 intended for cooperation with the granulator mill housing, were not to be sufficient, it is possible to retrofit to the outside of the sheet metal casing a gauge or fit member of the requisite accuracy.

As a result of the above-described casting method, the outcome will be that the sheet metal casing 13, in particular its surfaces 16 intended for cooperation with the granulator mill housing, will have a satisfactory support against the casting material, since this will, during the casting process itself, rest on the inside of the surfaces 16 of the sheet metal casing which have been brought into the correct position. This implies that, even after tightening of the anchorage devices, a completely satisfactory surface abutment will also occur between the underside of the feet 15 of the granulator mill housing 2 and the surfaces 16, and also between the inside of the sheet metal casing and the surface of the casting material abutting thereto.

What is claimed is:

1. A method of producing a frame unit for a machine for comminuting or granulating plastics, the frame unit being provided at least with anchorages for a granulator mill housing and a drive motor, and the frame unit being at least partly cast from a plastic- or concrete-based casting material in a mold, comprising, after a casting process, leaving the mold in position on the casting material;

providing the mold with a plurality of surfaces for cooperation with the granulator mill housing; and clamping the surfaces of the mold for cooperation with the granulator mill housing, against a configurationally stable clamping member and holding the surfaces fixed within predetermined tolerances during the casting process.

2. The method as claimed in claim 1, comprising providing two surfaces for cooperation with the granulator mill housing.

3. The method as claimed in claim 2, comprising applying the clamping member on the outside of the mold; and removing the clamping member after the casting process.

4. The method as claimed in claim 2, comprising applying the clamping member on the inside of the mold; and leaving the clamping member in place after the casting process.

5. The method as claimed in claim 2, comprising providing disks or washers on the inside of the mold in the regions of the surfaces of the mold intended for cooperation with the granulator mill housing.

6. The method as claimed in claim 2, comprising employing the anchorages for the granulator mill housing for fixedly retaining the clamping member.

7. The method as claimed in claim 1, comprising providing the mold with such a configuration that, in the finished state of the frame unit, the mold covers surfaces of the frame unit facing upwards and laterally.

8. The method as claimed in claim 1, comprising providing the mold with cores or tubing for realising conduit ducts in the finished frame unit.

9. The method as claimed in claim 1, comprising producing the mold from thin sheet metal.

10. The method as claimed in claim 1, comprising giving at least certain exposed surfaces of the mold a dust- and particle-binding protective treatment.

11. A frame unit produced according to the method as claimed in claim 1.

12. A machine for comminuting or granulating plastics including a frame unit produced according to the method as claimed in claim 1.

* * * * *